US005612875A

United States Patent [19]

Haendel et al.

[11] Patent Number: 5,612,875

[45] **Date of Patent: *Mar. 18, 1997**

[54] SYSTEM FOR ACCURATELY DETERMINING THE MILEAGE TRAVELED BY A VEHICLE WITHIN A STATE WITHOUT HUMAN INTERVENTION

[75] Inventors: Richard S. Haendel, Cedar Rapids, Iowa; James C. Neisch, Clarkston, Mich.

[73] Assignee: Rockwell Science Center Inc., Thousand Oaks, Calif.

[ * ] Notice: The term of this patent shall not extend beyond the expiration date of Pat. No. 5,359,528.

[21] Appl. No.: 328,982

[22] Filed: Oct. 24, 1994

Related U.S. Application Data

[63] Continuation of Ser. No. 19,714, Feb. 19, 1993, Pat. No. 5,359,528.

[51] Int. Cl.[6] ........ G06F 13/00

[52] U.S. Cl. ........ 364/424.04; 364/424.034; 364/449.1; 340/438

[58] Field of Search ........ 364/424.01, 424.03, 364/424.04, 449, 444; 73/178 R; 340/438, 439, 988, 990, 995

[56] References Cited

U.S. PATENT DOCUMENTS

| | | | |
|---|---|---|---|
| 4,939,652 | 7/1990 | Steiner | 364/424.04 |
| 5,021,961 | 6/1991 | Ross et al. | 364/444 |
| 5,229,947 | 7/1993 | Ross et al. | 364/444 |
| 5,247,440 | 9/1993 | Capurka et al. | 364/449 |

*Primary Examiner*—Gary Chin
*Attorney, Agent, or Firm*—Gregory G. Williams; M. Lee Murrah; George A. Montanye

[57] ABSTRACT

A system and method for monitoring and recording the mileage a truck travels within a particular state including a GPS receiver, an odometer, and a memory device which contains state boundary information and a processor for determining on a continual basis whether the positioned information received from the GPS receiver is in a particular state boundary and for recording mileage of the truck when the position and state boundary comparison determines that a change in state boundaries has occurred. Additionally, a storage device for storing the data output by the processor which includes the desired mileage within a particular state information is included.

2 Claims, 1 Drawing Sheet

SYSTEM FOR ACCURATELY DETERMINING THE MILEAGE TRAVELED BY A VEHICLE WITHIN A STATE WITHOUT HUMAN INTERVENTION

This application is a Continuation of U.S. patent application Ser. No. 08/019,714, filed on Feb. 19, 1993, now U.S. Pat. No. 5,359,528.

FIELD OF THE INVENTION

The present invention generally relates to vehicle monitoring systems and more particularly relates to electronic systems for monitoring the position of vehicles and even more particularly relates to electronic systems for recording the mileage that a vehicle drives within a certain state without the driver of the vehicle being required to interact with the system.

BACKGROUND OF THE INVENTION

Presently, commercial truck fleet operators frequently overpay road use taxes because there is no viable method of accurately recording the miles traveled by a truck in each state.

In today's trucking industry, trucks traveling in more than one state are required to have their road use tax apportioned among the states in which they travel. Typically, truck drivers maintain log books which show the time and routes they drive. These documents can be altered or falsified by the driver with little chance of detection.

Consequently, the state taxing authorities often refuse to accept the drivers log books as being accurate, and assess a road use tax based upon their inflated estimate of the number of miles driven within their state. This occurs more frequently in states that have a higher road use tax than nearby states.

One method which has been proposed, for enhancing the reliability of information relating to the mileage a truck travels in a particular state, includes transponders at the state boundaries of interstate highways which are used to record entries and exits from states.

While this method might be able to provide some enhanced reliability, it does have several serious drawbacks.

First of all, the use of transponders requires the states to spend funds for permanent infrastructure, and it further requires an agreement and coordination between the states to have compatible transponders. Additionally, the use of transponders restricts the ability of the system to monitor entries and exits on unprotected secondary roads.

Consequently, there exists a need for improving the information that state taxing authorities use to determine road use taxes, which overcome the problems of the log books and overcome the problems of the proposed transponder type system.

SUMMARY OF THE INVENTION

It is an object of the present invention to provide a truck monitoring system with enhanced reliability of mileage information.

It is a feature of the present invention to include a global positioning system (GPS) receiver in combination with a processor and memory device for monitoring the location of a vehicle.

It is an advantage of the present invention to eliminate the need for potential errors associated with driver involvement in mileage recordation.

It is another object of the present invention to provide a system for monitoring truck mileage within a state which does not require substantial hardware infrastructure expenditures by numerous states.

It is a feature of the present invention to not include transponders, and to rely solely upon the GPS, processor, and memory device to determine the position of a vehicle.

It is another advantage of the present invention to provide for the ability to monitor entries and exits from a state without use of transponders and thereby allowing for monitoring on secondary roads and even on areas where a truck may travel without a road.

The present invention provides an improved truck monitoring system having a GPS receiver, processor, and memory device utilized therein which is used to satisfy the aformentioned needs, provide the previously propounded objects, and include the above described features, and achieve the already articulated advantages. The invention is carried out in a "driver interaction-less" system, in the sense that the interaction or involvement of a truck driver to maintain logs is eliminated. Additionally, the system is carried out in a "transponder-less" system, in the sense that the use of transponders along predetermined highways at state boundaries is eliminated. Instead, the present invention contains a GPS receiver onboard the truck and a processor and memory device which has stored therein numerous state boundaries and the combination continuous determination of the location of the vehicle within a state.

Accordingly, the present invention provides a system for monitoring the mileage driven by a truck within a given state, which includes a GPS receiver, a processor, an odometer, and a memory device for storage of boundary information and a data output or storage device for storing the mileage a truck travels within a particular state.

BRIEF DESCRIPTION OF THE DRAWINGS

The invention may be more fully understood by reading the following description of the preferred embodiments of the invention in conjunction with the appended drawing wherein.

DETAILED DESCRIPTION OF THE INVENTION

Figure 1:
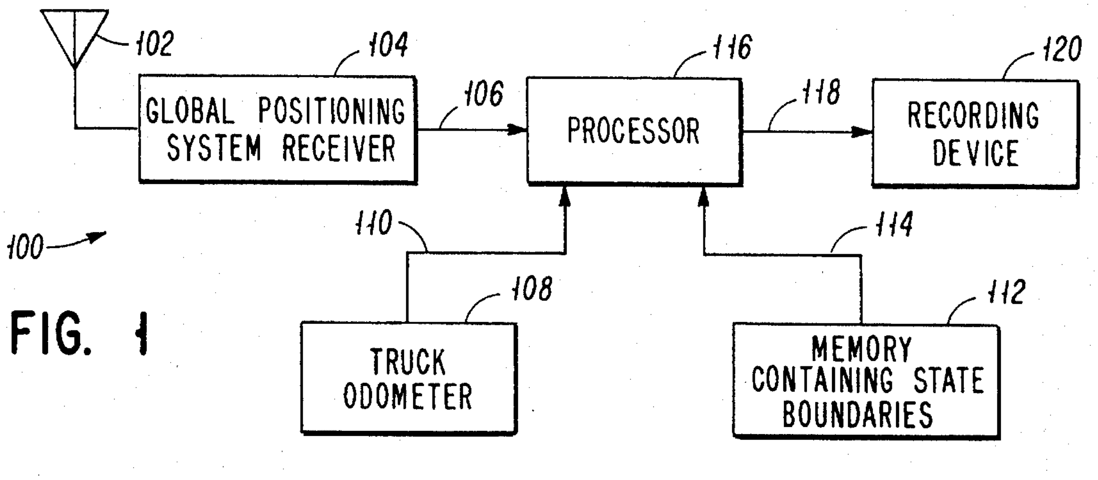
FIG. 1, is a block diagram of the system and apparatus of the present invention which would be installed on a vehicle.

Now referring to FIG. 1, there is shown a truck monitoring system of the present invention, generally designated 100, having an antenna 102 for receiving signals from global positioning system satellites, in earth orbit, not shown, and a global positioning receiver 104 coupled thereto. Receiver 104 continuously outputs information relating to the longitude, latitude, and time and date on line 106. A truck odometer 108 is provided which provides a signal representative of the total mileage traveled since some pre-determined time, the truck odometer may be the typical odometer provided in the dash of a truck or it may be a separate or independent device which monitors the wheel rotation. The odometer 108 provides a signal on line 110 representative of the truck mileage. Also shown is memory device 112 which contains memory of geographic state boundaries. This memory device 112 may be any memory device such as PROMS, E-PROMS, ROMS, CD-ROMS, tapes, disk drives, etc. and the appropriate hardware to drive such memory if necessary. The memory 112 is capable of being accessed on line 114 by the processor 116.

Figure 2:
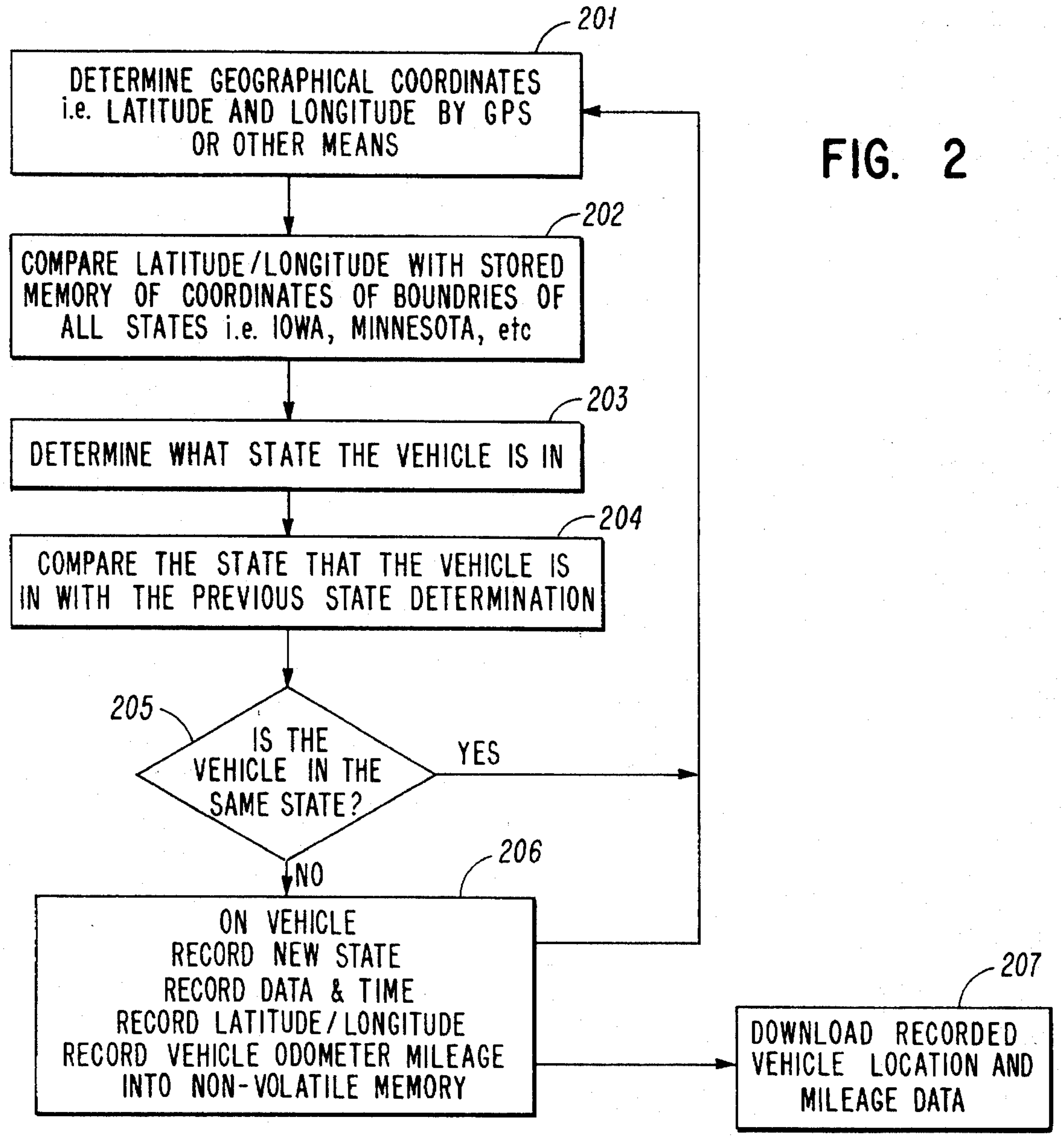
FIG. 2, is a flow chart of the method of the present invention which is implemented by the system of FIG. 1.

Now referring to FIG. 2, there is shown a flow chart of the method, of the present invention, which includes the first step 201 which is to determine geographical coordinates, i.e. latitude and longitude by GPS or other means. A GPS receiver is the preferred source of latitude and longitude information but a Loran receiver or any other device capable of providing geographic coordinates could be substituted. Once the geographic coordinates are determined, step 202 is to compare the latitude/longitude with stored memory of coordinates of boundaries of all states. This comparison is done by processor 116. The comparison results in a determination of what state the vehicle is presently in, which is step 203. Step 204 is to compare the state that the vehicle is presently in with the previous state determination. Step 205 is if the vehicle is in the same state as the previous state determination, then the process of steps 201, 202, 203, and 204 are repeated at a predetermined frequency, until the comparison of step 204 results in a different state from the previous state determination. Step 206 occurs when the new state determination is different from the previous state determination, and under such circumstances, the new state is recorded, the time and date is recorded, the longitude/latitude is recorded, and also the vehicle odometer mileage is recorded into recording device 120.

Step 207 is performed when the vehicle returns to its home base or when a specific request is made and results in the down loading of the recorded location, time, state, mileage, and date information.

It is this downloaded information that is utilized by the state taxing authorities to determine the actual mileage driven by the vehicle in a particular state. The above steps

201–207 do not require any intervention by the vehicle operator, and therefore are not subject to manipulations or falsifications by the driver.

It is thought that the vehicle monitoring system and method, of the present invention, and many of its attendant advantages will be understood from the foregoing description and it will be apparent that various changes may be made in the form, construction, and arrangement of the parts thereof without departing from the spirit and scope of the invention or sacrificing all of its material advantages, the form herein, before described merely a preferred or exemplary embodiment thereof.

One of the beneficial aspects of the present invention is that it is a highly precise system and method. The system precision is limited by the accuracy of the GPS receiver which is typically ±25 meters or less and the odometer which is typically $\pm 1/10$ mile.

We claim:

1. A system for determining distance traveled by a vehicle within a predetermined jurisdiction comprising:

a positioning system for generating present position information, in a predetermined geographic coordinate system, for said vehicle;

a memory device, containing geographic information of boundaries of said predetermined jurisdiction;

a processor coupled with said positioning system and said memory device for comparing the present position information with said geographic information and determining if said vehicle has crossed one of said boundaries; and means for determining the distance traveled by said vehicle between successive events of said vehicle crossing said boundaries.

2. A system of claim 1, wherein the means for determining the distance is an odometer.

* * * * *